United States Patent
Lin

(10) Patent No.: US 7,010,484 B2
(45) Date of Patent: Mar. 7, 2006

(54) METHOD OF PHRASE VERIFICATION WITH PROBABILISTIC CONFIDENCE TAGGING

(75) Inventor: Yi-Chung Lin, Keelung (TW)

(73) Assignee: Industrial Technology Research Institute, Hsinchu (TW)

( * ) Notice: Subject to any disclaimer, the term of this patent is extended or adjusted under 35 U.S.C. 154(b) by 660 days.

(21) Appl. No.: 10/012,483

(22) Filed: Dec. 12, 2001

(65) Prior Publication Data

US 2003/0083876 A1 May 1, 2003

(30) Foreign Application Priority Data

Aug. 14, 2001 (TW) .................................. 90119864

(51) Int. Cl.
*G10L 15/08* (2006.01)
*G10L 15/12* (2006.01)
*G10L 15/04* (2006.01)

(52) U.S. Cl. .................. 704/240; 704/251; 704/236
(58) Field of Classification Search ............... 704/252, 704/251, 255

See application file for complete search history.

(56) References Cited

U.S. PATENT DOCUMENTS

| 5,675,706 | A  | * | 10/1997 | Lee et al. ............. 704/256 |
| 5,797,123 | A  | * | 8/1998  | Chou et al. ........... 704/256 |
| 5,878,390 | A  | * | 3/1999  | Kawai et al. .......... 704/231 |
| 6,539,353 | B1 | * | 3/2003  | Jiang et al. ........... 704/254 |
| 6,631,346 | B1 | * | 10/2003 | Karaorman et al. ...... 704/9 |
| 6,760,702 | B1 | * | 7/2004  | Chien et al. .......... 704/251 |
| 6,816,830 | B1 | * | 11/2004 | Kempe ................. 704/9 |

* cited by examiner

*Primary Examiner*—Susan McFadden
*Assistant Examiner*—Matthew J Sked
(74) *Attorney, Agent, or Firm*—Birch, Stewart, Kolasch & Birch, LLP

(57) ABSTRACT

A method of phrase verification to verify a phrase not only according to its confidence measures but also according to neighboring concepts and their confidence tags. First, an utterance is received, and the received utterance is parsed to find a concept sequence. Subsequently, a plurality of tag sequences corresponding to the concept sequence is produced. Then, a first score of each of the tag sequences is calculated. Finally, the tag sequence of the highest first score is selected as the most probable tag sequence, and the tags contained therein are selected as the most probable confidence tags, respectively corresponding to the concepts in the concept sequence.

9 Claims, 3 Drawing Sheets

METHOD OF PHRASE VERIFICATION WITH PROBABILISTIC CONFIDENCE TAGGING

BACKGROUND OF THE INVENTION

1. Field of the Invention

The present invention relates to a method of phrase verification, and particularly to a method of phrase verification in which a phrase is verified not only according to its own confidence measures as obtained from different methods, but also according to neighboring phrases and their confidence levels.

2. Description of the Related Art

In recent years, the application of speech recognition, as used in voice dialing in cellular phones and speech input in PDAs (personal digital assistants), has been generally used to help users access cellular phones and PDAs in a more convenient way, with operations closer to human nature.

Although substantial progress has been made in speech recognition over the last decade, speech recognition errors are still a major problem in such systems. The spontaneous utterances faced by a spoken dialogue system are frequently disfluent, noisy, or even out-of-domain. These characteristics seriously increase the chance of misrecognition and, consequently, degrade the performance of dialogue system. Therefore, verifying recognized words/phrases is vitally important for spoken dialogue systems.

In past research, two major approaches to word/phrase verification have been used. The first approach uses confidence measures to reject misrecognized words/phrases. The confidence measure of a word/phrase can be assessed by utterance verification or derived from the sentence probabilities of N-best hypotheses. Another approach uses classification models, such as decision tree and neural network, to label words with confidence tags. A confidence tag is either "acceptance" or "rejection". The features used for classification are usually obtained from the intermediate results in the speech recognition and language understanding phases.

Although various kinds of information have been explored to assess the confidence measure or select the confidence tag for a word/phrase, the contextual confidence information is rarely leveraged. Since correct and incorrect words/phrases tend to appear consecutively, the confidence information of a word/phrase is helpful in assessing the confidence levels of its neighboring words/phrases.

For example, for spoken dialogue providing weather information, the word sequence "weather forecast" occurs frequently in users' queries. If the word "forecast" follows the word "weather" of high-level confidence, it is expected that the confidence level of the word "forecast" is also high. On the other hand, if the confidence level of the word "weather" is low, the confidence level of the word "forecast" is likely to be low.

In order to make use of the contextual confidence information, the invention discloses a novel probabilistic verification model to select confidence tags for concepts (i.e, meaningful phrases).

SUMMARY OF THE INVENTION

It is therefore an object of the present invention to provide a method of phrase verification in which a phrase is verified not only according to its own confidence measures but also according to those of neighboring concepts. Using the present invention, a dialogue system can more accurately reject the incorrect concepts coming from speech recognition errors.

To achieve the above object, a first embodiment of the present invention provides a method of phrase verification with probabilistic confidence tagging.

First, an utterance is received, and the received utterance is parsed to find a concept sequence. Subsequently, a plurality of tag sequences corresponding to the concept sequence is produced. Then, a first score of each of the tag sequences is calculated. Finally, the tag sequence of the highest first score is selected as the most probable tag sequence, and the tags in the most probable tag sequence are selected as most probable confidence tags respectively corresponding to the concepts in the concept sequence.

Furthermore, a second embodiment of the present invention further assesses the confidence measure of each of the concepts in the concept sequence. Thereafter, a second score of each of the tag sequences is calculated based on the concepts in the concept sequence and the corresponding tags in the tag sequence. Then, the first score calculated in the first embodiment and the second score are proceeded a weighted calculation, thus a total score is acquired.

Finally, the tag sequence of the highest total score is selected as the most probable tag sequence, and the tags contained therein are selected as most probable confidence tags, respectively corresponding to the concepts in the concept sequence.

According to the present invention, the first score is the contextual confidence score and the second score is the confidence measure score.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

DETAILED DESCRIPTION OF THE PREFERRED EMBODIMENT

Figure 1:
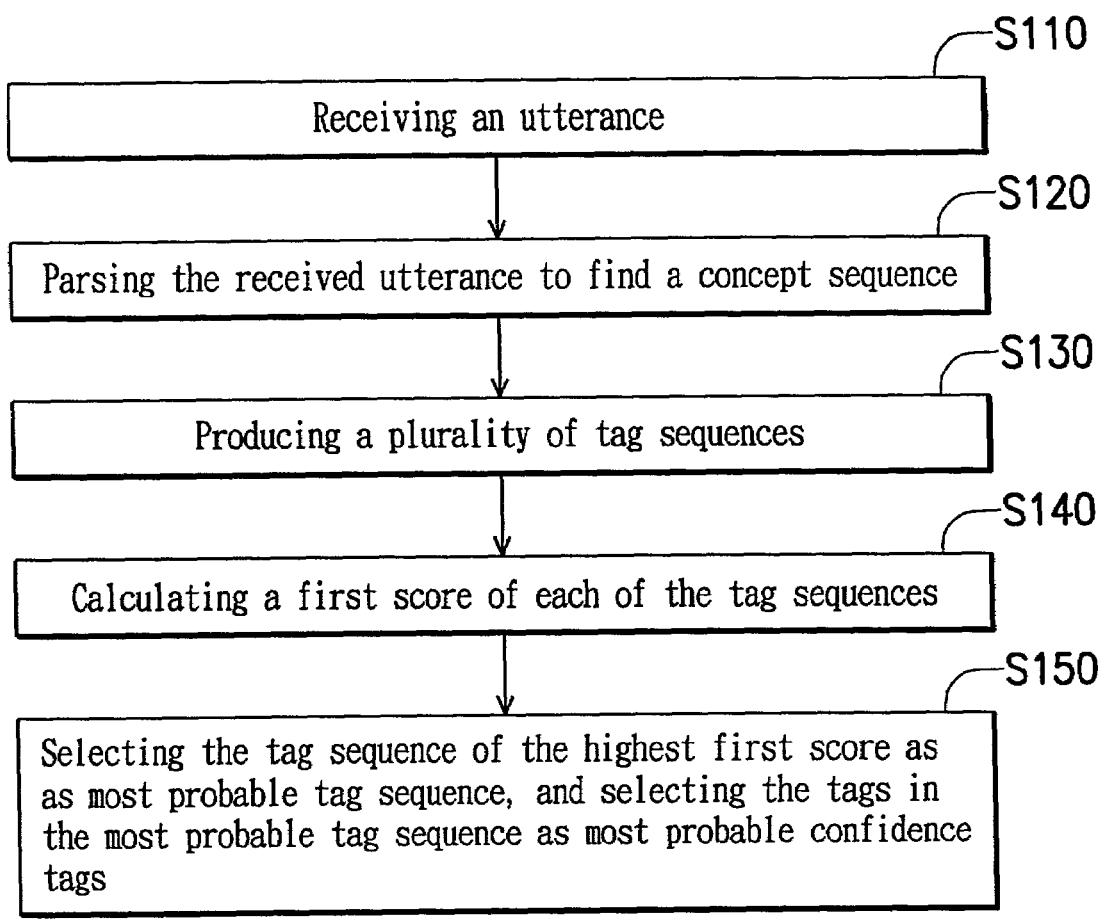
FIG. 1 is a flow chart illustrating the operation of a method of phrase verification with probabilistic confidence tagging according to the first embodiment of the present invention.

Referring to the accompanying figures, the preferred embodiments of the present invention are described as follows.

[Overall Concepts]

Concept-based Speech Understanding

The concept-based approach has been widely adopted in dialogue systems to understand users' utterances. Instead of parsing a sentence completely, this approach uses partial parsing to segment a sentence into a sequence of phrases, called concepts. For example, the query "tell me the forecast in Taipei tonight" can be parsed to the concept sequence "Query Topic Location Date". Each of the concepts may correspond to at least one word.

In general, the procedure of concept-based speech understanding consists of two phases. First, the word graph output from the speech recognizer is parsed into a concept graph according to a predefined grammar. Each path in the concept graph represents one possible concept sequence for the input utterance. Then, in the second phase, some stochastic language models, such as the stochastic context-free grammar and concept-bigram models, are used to find the most probable concept sequence. Since the concept-based approach does not require the input sentences to be fully grammatical, it is robust in handling the sentence hypotheses mixed with speech recognition errors.

Probabilistic Concept Verification

Although the concept-based approach is able to spot the concepts in a hypothetical sentence mixed with speech recognition errors, it is not able to detect whether the spotted concepts are correct or not. The role of the stochastic language model in the concept-based approach is to assess the relative possibilities of all possible concept sequences and select the most probable one. The scores obtained from the language model can be used for a comparison of competing concept sequences, but not for an assessment of the probability that a spotted concept is correct. However, due to imperfect speech recognition, there is always a possibility of incorrect concepts. To reduce the impact of speech recognition errors, a probabilistic verification model is proposed to detect the incorrect concepts in a concept sequence.

In a speech understanding system with concept verification, the user utterance is first recognized with a speech recognition module. A word graph is constructed to represent the possible sentence hypotheses for the input utterance. Then, a language understanding module parses the word graph to a concept graph according to a predefined grammar and selects the best concept sequence from the concept graph. The confidence levels of the concepts in the concept sequence will be optionally assessed by different confidence measurement modules. Finally, a concept verification module verifies every concept in the concept sequence with or without its confidence measures obtained from the optional confidence measurement modules.

The task of verifying concepts is regarded as labeling the concepts in a concept sequence with confidence tags. The set of confidence tags is a finite discrete set. It is designed according to application-specific needs. For most applications, the set is comprised of three tags: "acceptance", "rejection", and "void". The first two tags are designated to the crucial concepts that are crucial for the interpretation of a user utterance and need to be verified. If a crucial concept is verified to be correct, it is labeled with the "acceptance" tag. Otherwise, it is labeled with the "rejection" tag. The "void" tag is designated to the filler concepts that are irrelevant to interpretation of a user utterance. Table 1 shows an example of the possible confidence tags for the concepts derived from the sentence "tell me the forecast in Taipei tonight". In this example, the concept "Query" is a filler concept and the other concepts ("Topic", "Location" and "Date") are crucial concepts.

TABLE 1

| Words | tell me | the forecast | in Taipei | tonight |
|---|---|---|---|---|
| Concepts | Query | Topic | Location | Date |
| Possible tags | void | acceptance rejection | acceptance rejection | acceptance rejection |

Assume that X confidence measurement modules are available in the speech understanding system. C denotes the sequence of concepts to be verified and $M_i$ denote its corresponding sequence of confidence measures provided by the i-th confidence measurement module. The labeling process is formulated to find the most probable tag sequence $\hat{T}$ for the given concept sequence C and confidence measure sequences $M_l, \ldots, M_X$ as follows.

$$\hat{T} = \mathrm{argmax}_T P(T \mid C, M_1, \cdots, M_X) \quad (1)$$

$$= \mathrm{argmax}_T \frac{P(M_1, \cdots, M_X \mid T, C) P(T, C)}{P(C, M_1, \cdots, M_X)}$$

$$= \mathrm{argmax}_T P(M_1, \cdots, M_X \mid T, C) P(T, C)$$

Where T denotes one possible tag sequence. Let C be comprised of n concepts and $c_i$ denote the i-th concept. As a result, T is also comprised of n confidence tags. Let $t_i$ denote the i-th tag in T and $\tau_i$ denotes the pair of $c_i$ and $t_i$. Then, the probability term P(T,C) in the above equation is rewritten as:

$$P(T, C) = P(\tau_1^n) = \prod_{i=1}^n P(\tau_i \mid \tau_1^{i-1}) \approx \prod_{i=1}^n P(\tau_i \mid \tau_{i-N+1}^{i-1}) \quad (2)$$

Where $\tau_1^n$ is the shorthand notation for "$\tau_1, \tau_2, \ldots, \tau_n$" and N is a positive integer. In equation (1), the probability $P(M_l, \ldots, M_X \mid T, C)$ is further approximated as:

$$P(M_1, \cdots, M_X \mid T, C) \approx \prod_{h=1}^X P(M_h \mid T, C) = \quad (3)$$

$$\prod_{h=1}^X P(m_{h,1}^{h,n} \mid t_1^n, c_1^n) \approx \prod_{h=1}^X \prod_{i=1}^n P(m_{h,i} \mid t_i, c_i)$$

Where $m_{h,i}$ denotes the confidence measure of $c_i$ assessed by the h-th confidence measurement module. Because the probability $P(m_{h,i} \mid t_i, c_i)$ is hard to accurately estimate, it is rewritten as follows.

$$P(m_{h,i} \mid t_i, c_i) = \frac{P(t_i \mid m_{h,i}, c_i) P(m_{h,i}, c_i)}{P(t_i, c_i)} \quad (4)$$

Since the prior probability $P(m_{h,i}, c_i)$ is a constant, it can be ignored without changing the rank of competing tag sequences. According to the equations (2), (3) and (4), the equation (1) is rewritten as:

$$\hat{t}_1^n = \underset{t_1^n}{\operatorname{argmax}} \left\{ \prod_{h=1}^{X} \prod_{i=1}^{n} \frac{P(t_i \mid m_{h,i}, c_i)}{P(t_i, c_i)} \times \prod_{i=1}^{n} P(\tau_i \mid \tau_{i-N+1}^{i-1}) \right\} \quad (5)$$

$$= \underset{t_1^n}{\operatorname{argmax}} \left\{ \sum_{h=1}^{X} \sum_{i=1}^{n} \log \frac{P(t_i \mid m_{h,i}, c_i)}{P(t_i, c_i)} + \sum_{i=1}^{n} \log P(\tau_i \mid \tau_{i-N+1}^{i-1}) \right\}$$

$$= \underset{t_1^n}{\operatorname{argmax}} \left\{ \sum_{h=1}^{X} S_{M,h} + S_c \right\}$$

Where $$S_{M,h} = \sum_{i=1}^{n} \log \frac{P(t_i \mid m_{h,i}, c_i)}{P(t_i, c_i)}$$

is called the h-th confidence measure score and $$S_c = \sum_{i=1}^{n} \log P(\tau_i \mid \tau_{i-N+1}^{i-1})$$

is called contextual confidence score.

Due to the modeling error caused by approximations and the estimation error caused by insufficient training data, different kinds of scores have different discrimination powers. To enhance the overall discrimination power in choosing the most probable candidate, scores should be adequately weighted. Therefore, the following scoring function is defined to find the most probable sequence of confidence tags.

$$S(t_1^n) = \sum_{h=1}^{X} w_{M,h} \times S_{M,h} + w_c \times S_c \quad (6)$$

Where $w_{M,1}, \ldots, w_{M,h}$ and $w_c$ are weighting factors. The proposed scoring function still works even if no confidence measurement modules are available. In that case, the scoring function becomes $S(t_1^n) = S_c$.

Confidence Measure Score Estimation

Figure 3:
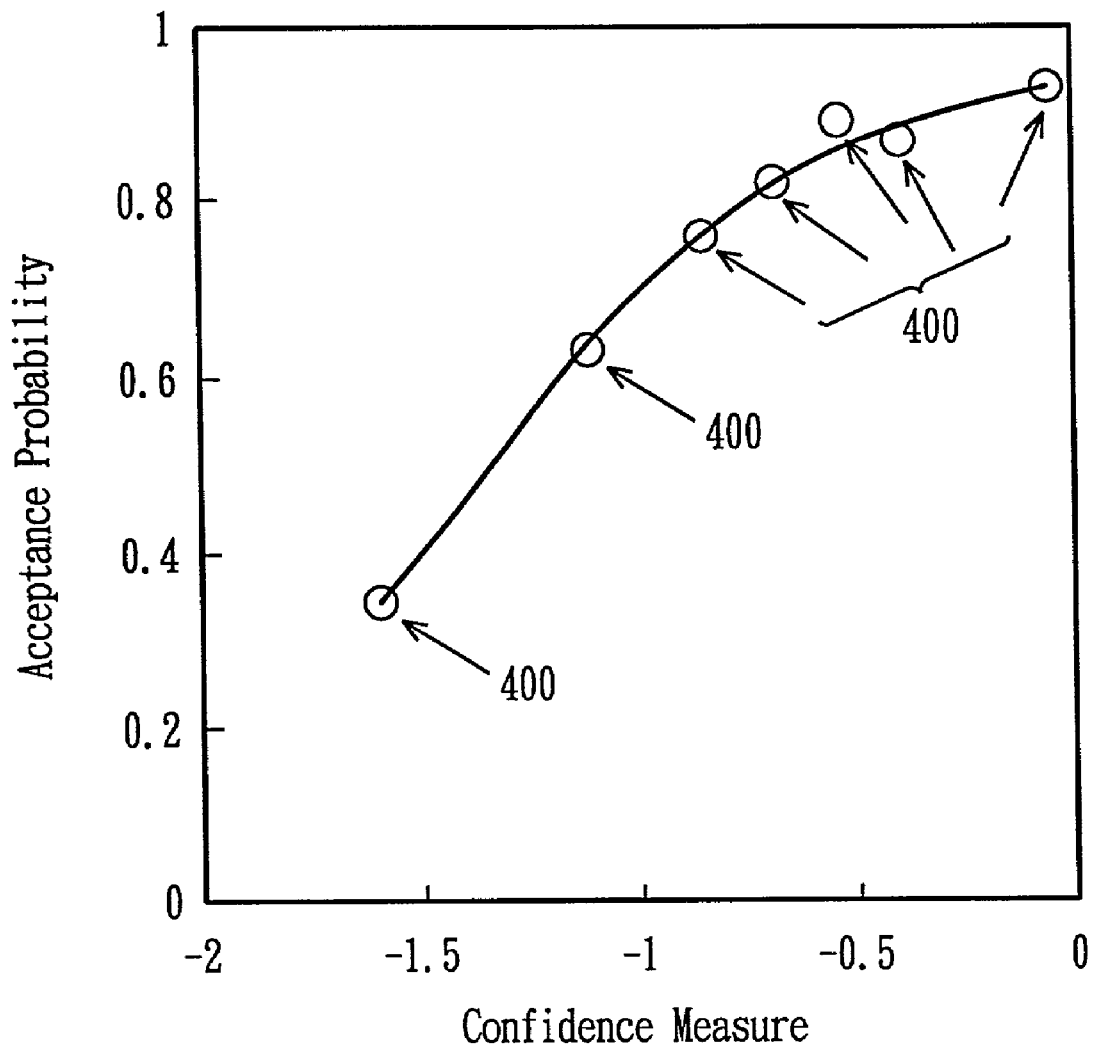
FIG. 3 shows an example of acceptance probability versus confidence measure for the concept "Date".

In general, the confidence measure is a real number. Therefore, the probability $P(t_i \mid m_{h,i}, c_i)$ cannot be reliably estimated by counting limited outcomes $(t_i, m_{h,i}, c_i)$. Instead of directly counting, a probability curve fitting method is proposed to estimate $P(t_i \mid m_{h,i}, c_i)$. In this method, the outcomes of a particular concept are sorted by the value of confidence measure. Then, the sorted outcomes are split into groups of fixed size. Afterward, for every group, the acceptance probability and the mean of confidence measure are computed. In FIG. 3, every circle 400 represents the acceptance probability and the mean of confidence measure of a group of the concept "Date". Finally, a polynomial $f_{c_i}(x)$ of degree 2 is found to fit the circles 400 in a least square error sense. This polynomial is used to compute $P(t_i \mid m_{h,i}, c_i)$ for every possible value of confidence measure as follows.

$$P(t_i \mid m_{h,i}, c_i) = \begin{cases} \max(0, \min(1, f_{c_i}(m_{h,i}))) & t_i = A \\ 1 - \max(0, \min(1, f_{c_i}(m_{h,i}))) & t_i = R \end{cases} \quad (7)$$

Where $t_i = A$ means $t_i$ is "acceptance" and $t_i = R$ means $t_i$ is "rejection". The purpose of the functions max ( ) and min ( ) is to bound the value of $P(t_i \mid m_{h,i}, c_i)$ between 0 and 1.

[First Embodiment]

FIG. 1 shows a flow chart illustrating the operation of a method of phrase verification with probabilistic confidence tagging according to the first embodiment of the present invention. Referring to FIG. 1, the first embodiment of the present invention is described as follows.

In the first embodiment, there is no confidence measurement module available. First, in steps S110, a user utterance U is received, and in step S120, the received utterance is parsed to find a concept sequence C. In step S120, any one of the concept-based approaches can be used to find the concept sequence, as described above.

In this embodiment, assume that the user utterance U is "forecast in Taipei", and the corresponding concept sequence C recognized after step 120 is "Topic Location".

Then, in step S130, a plurality of tag sequences T are produced. Each of the tag sequence T includes a first tag $t_1$ corresponding to a first concept $c_1$ in concept sequence C, and a second tag $t_2$ corresponding to a second concept $c_2$ in concept sequence C. If the confidence tags is one of "acceptance" (denoted by "A") or "rejection" (denoted by "R"). These tag sequences T can be "A,A", "A,R", "R,A" and "R,R".

Subsequently, in step S140, for every tag sequence T, the contextual confidence score $S_c$ (first score) is calculated. If the parameter N of the contextual confidence score $S_c$ is set to 2, the score can be computed as follows:

$$S_c = \sum_{i=1}^{2} \log P(\tau_i \mid \tau_{i-1}) = \log P(\tau_1 \mid \tau_0) + \log P(\tau_2 \mid \tau_1)$$

$$= \log P(\tau_1) + \log P(\tau_2 \mid \tau_1)$$

$$= \log P(c_1, t_1) + \log P(c_2, t_2 \mid c_1, t_1)$$

For example, if the tag sequence T is "R,A", the corresponding contextual confidence score $S_c$ is, log P(Topic,R)+log P(Location,A|Topic,R)

In step S140, the object is to calculate the value of the equation (6)

$$\left( S(t_1^n) = \sum_{h=1}^{X} w_{M,h} \times S_{M,h} + w_c \times S_c \right)$$

of each of the tag sequences T. Since there is no confidence measurement module available, the weighting factors $w_{M,1}, \ldots, w_{M,h}$ is set to 0 and $w_c$ is set to 1, that is $S(t_1^n) = S_c$.

Finally, in step S150, the tag sequence T of highest contextual confidence score $S_c$ is selected as the most probable tag sequence $\hat{T}$, and the first tag $t_1$ and second tag $t_2$ in most probable tag sequence $\hat{T}$ are selected as a first most probable tag $\hat{t}_1$ and a second most probable tag $\hat{t}_2$.

[Second Embodiment]

Figure 2:
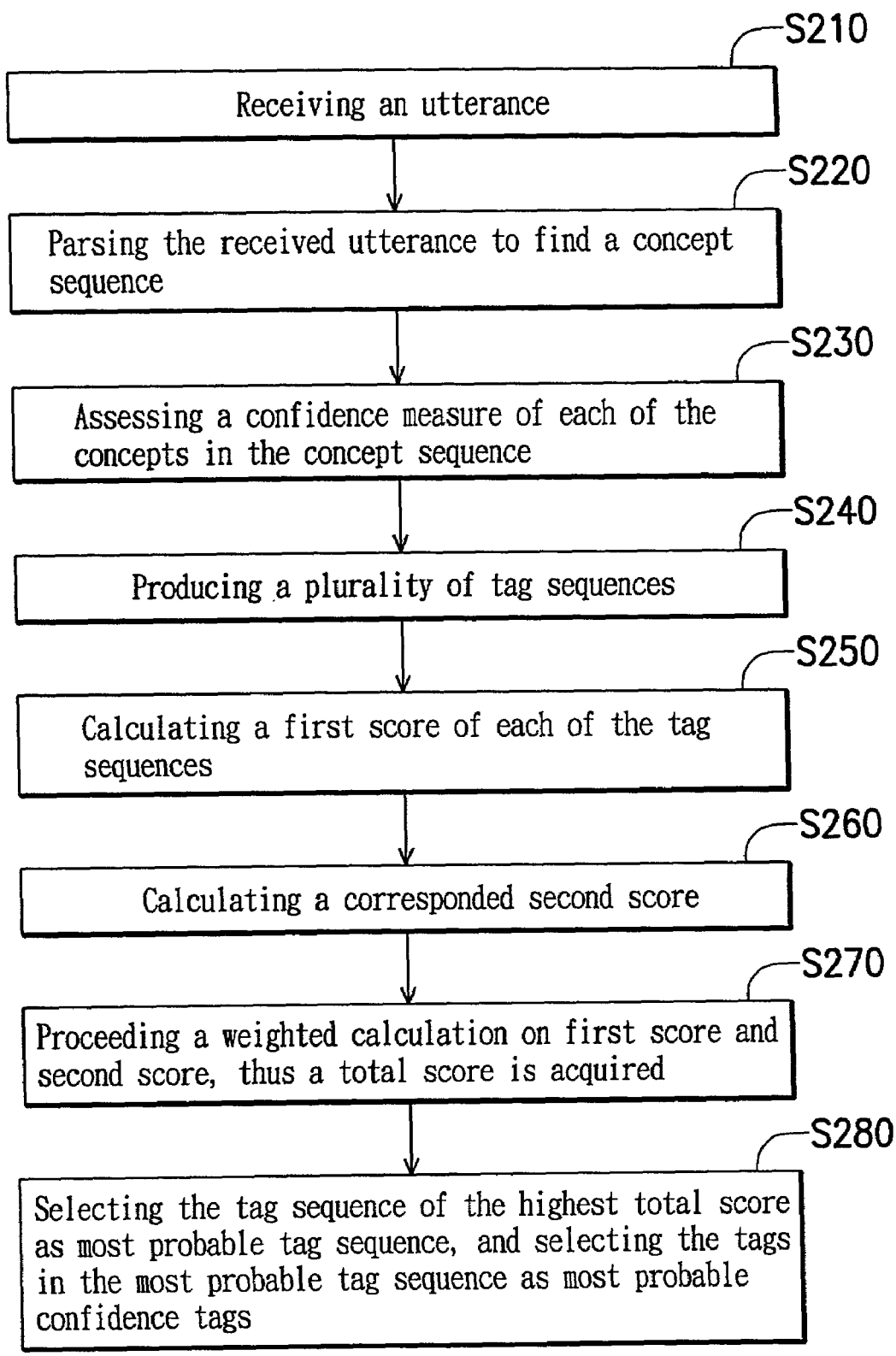
FIG. 2 is a flow chart illustrating the operation of a method of phrase verification with probabilistic confidence tagging according to the second embodiment of the present invention.

FIG. 2 shows a flow chart illustrating the operation of a method of phrase verification with probabilistic confidence tagging according to the second embodiment of the present invention. Referring to FIG. 2, the second embodiment of the present invention is described as follows.

In the second embodiment, there is at least one confidence measurement module available. First, in steps S210, a user utterance U is received, and in step S220, the received utterance is parsed to find a concept sequence C. Similarly, in step S220, any one of the concept-based approaches can be used to find the concept sequence, such as described above.

In this embodiment, also assume that the user utterance U is "forecast in Taipei", and the corresponding concept sequence C recognized after step 220 is "Topic Location".

Then, in step S230, the confidence measure of each of the concepts in concept sequence C is assessed by the confidence measurement module. The confidence measurement module can be established according to any one of the confidence measurement methods, such as the acoustic confidence measure. In this embodiment, assume that only one confidence measurement module is used, the parameter X in equation (6) is set to 1, and the confidence measure corresponding to a first concept $c_1$ in concept sequence C after step S230 is $m_{I,1}$ and the confidence measure corresponding to a second concept $c_2$ in concept sequence C after step S230 is $m_{I,2}$.

Then, in step S240, a plurality of tag sequences T are produced. Each of the tag sequence T includes a first tag $t_1$ corresponding to the first concept $c_1$, and a second tag $t_2$ corresponding to the second concept $c_2$. If the confidence tags is one of "acceptance" (denoted by "A")or "rejection" (denoted by "R"). These tag sequences T can be "A,A", "A,R", "R,A" and "R,R".

Subsequently, in step S250, for every tag sequence T, the contextual confidence score $S_c$ (first score) is calculated. In step S250, the calculation of the contextual confidence score $S_c$ is similar to the step S140 in the first embodiment.

Then, in step S260, for every tag sequence T, the confidence measure score $S_{M,1}$ (second score) is calculated. For example, if the tag sequence T is "R,A", the corresponding confidence measure score $S_{M,1}$ is, $$S_{M,1} = \sum_{i=1}^{2} \log \frac{P(t_i \mid m_{1,i}, c_i)}{P(t_i, c_i)}$$

$$= \log \frac{P(R \mid m_{1,1}, \text{Topic})}{P(R, \text{Topic})} + \log \frac{P(A \mid m_{1,2}, \text{Location})}{P(A, \text{Location})}$$

Thereafter, in step S270, a weighted calculation is proceeded on the contextual confidence score $S_c$ and the confidence measure score $S_{M,1}$, thus a total score $S(t_1^n)$ is acquired. In step S270, the object is to calculate the value of the equation (6)

$$\left( S(t_1^n) = \sum_{h=1}^{X} w_{M,h} \times S_{M,h} + w_c \times S_c \right)$$

of each of the tag sequences T. The weighting factors $W_{M,1}, \ldots, W_{M,h}$ and $w_c$ can be adjusted for different specific cases.

Finally, in step S280, the tag sequence T of highest total score $S(t_1^n)$ is selected as the most probable tag sequence $\hat{T}$, and the first tag $t_1$ and second tag $t_2$ in most probable tag sequence $\hat{T}$ are selected as a first most probable tag $\hat{t}_1$ and a second most probable tag $\hat{t}_2$.

As a result, using the method of phrase verification according to the present invention, a phrase can be verified not only according to its acoustic confidence measure but also according to neighboring concepts and their confidence tags. Using the present invention, a dialogue system can more accurately reject the incorrect concepts from speech recognition errors.

Although the present invention has been described in its preferred embodiment, it is not intended to limit the invention to the precise embodiment disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A method of phrase verification with probabilistic confidence tagging, comprising the steps of:
   receiving an utterance;
   parsing the received utterance to find a concept sequence, in which the concept sequence comprises a plurality of concepts, each corresponding to at least one word in the utterance;
   producing a plurality of tag sequences corresponding to the concept sequence, in which each of the tag sequences comprises a plurality of tags, each indicating whether the corresponding concept is required to be verified, and corresponding possible verification results;
   calculating a first score of each of the tag sequences based on a probability corresponding to the tags therein; and
   selecting the tag sequence of the highest first score as a most probable tag sequence, and selecting the tags in the most probable tag sequence as most probable confidence tags.

2. The method as claimed in claim 1, wherein the tag has a binary value, respectively representing acceptance and rejection.

3. The method as claimed in claim 1, wherein the tag has multiple values, respectively representing different levels of confidence.

4. The method as claimed in claim 1, wherein the first score is a contextual confidence score.

5. A method of phrase verification with probabilistic confidence tagging, comprising the steps of:
   receiving an utterance;
   parsing the received utterance to find a concept sequence, in which the concept sequence comprises a plurality of concepts, each corresponding to at least one word in the utterance;
   assessing at least one confidence measure of each of the concepts in the concept sequence;
   producing a plurality of tag sequences corresponding to the concept sequence, in which each of the tag sequences comprises a plurality of tags, each indicating whether the corresponding concept is required to verify, and corresponding possible verification results;
   calculating a first score of each of the tag sequences based on the probability corresponding to the tags therein;
   calculating a second score of each of the tag sequences;

proceeding a weighted calculation on the first score and second score, thus a total score is acquired; and selecting the tag sequence of the highest total score as a most probable tag sequence, and selecting the tags in the most probable tag sequence as most probable confidence tags.

6. The method as claimed in claim 5, wherein the tag has a binary value, respectively representing acceptance and rejection.

7. The method as claimed in claim 5, wherein the tag has multiple values, respectively representing different levels of confidence.

8. The method as claimed in claim 5, wherein the first score is a contextual confidence score.

9. The method as claimed in claim 5, wherein the second score is computed from a set of confidence measure scores.

* * * * *